(12) United States Patent
Aiiso

(10) Patent No.: US 10,899,094 B2
(45) Date of Patent: Jan. 26, 2021

(54) METHOD OF MANUFACTURING PLASTIC LENS, METHOD OF POSITIONING FILM, AND COMPOSITE BODY

(71) Applicants: HOPNIC LABORATORY CO., LTD., Sabae (JP); MITSUI CHEMICALS, INC., Tokyo (JP)

(72) Inventor: Yoshimitsu Aiiso, Sabae (JP)

(73) Assignees: HOPNIC LABORATORY CO., LTD., Sabae (JP); MITSUI CHEMICALS, INC., Tokyo (JP)

(*) Notice: Subject to any disclaimer, the term of this patent is extended or adjusted under 35 U.S.C. 154(b) by 0 days.

(21) Appl. No.: 15/557,687

(22) PCT Filed: Jan. 14, 2016

(86) PCT No.: PCT/JP2016/050938
§ 371 (c)(1),
(2) Date: Sep. 12, 2017

(87) PCT Pub. No.: WO2016/143379
PCT Pub. Date: Sep. 15, 2016

(65) Prior Publication Data
US 2018/0050507 A1    Feb. 22, 2018

(30) Foreign Application Priority Data
Mar. 12, 2015    (JP) ................. 2015-049440

(51) Int. Cl.
*B29D 11/00*    (2006.01)
*G02C 7/02*    (2006.01)
(Continued)

(52) U.S. Cl.
CPC ........ *B29D 11/00413* (2013.01); *B29C 39/10* (2013.01); *B29C 39/12* (2013.01);
(Continued)

(58) Field of Classification Search
CPC ................................. B29D 11/00413
See application file for complete search history.

(56) References Cited

U.S. PATENT DOCUMENTS 7,767,304 B2    8/2010    Berzon
7,811,481 B2    10/2010    Kato
(Continued)

FOREIGN PATENT DOCUMENTS

EP    1713847 A1    10/2006
EP    1739462 A1    1/2007
(Continued)

OTHER PUBLICATIONS

Lionetta et al., "Monitoring the Cure State of Thermosetting Resins by Ultrasound", Materials, Sep. 2013, pp. 3783-3804. (Year: 2013).*
(Continued)

*Primary Examiner* — Lisa L Herring
(74) *Attorney, Agent, or Firm* — Buchanan, Ingersoll & Rooney PC

(57) ABSTRACT

A method of manufacturing a plastic lens includes: a step of putting a first curable composition over a forming surface of a first mold substrate having the forming surface for forming a lens surface; a step of spreading the first curable composition over the entire forming surface by pressing the composition with a film to form a first curable composition layer and separating the film from the first mold substrate by a predetermined distance through the formed first curable composition layer; a step of covering defined surfaces; a step of injecting a second curable composition into a defined location; a step of curing the first curable composition layer and the injected second curable composition; and a step of removing to obtain a plastic lens.

16 Claims, 2 Drawing Sheets

(51) Int. Cl.
*G02C 7/12* (2006.01)
*B29K 629/00* (2006.01)
*B32B 37/02* (2006.01)
*G02B 5/30* (2006.01)
*B29C 39/12* (2006.01)
*B29C 39/24* (2006.01)
*B29C 39/10* (2006.01)
*B29K 105/20* (2006.01)
*B29K 667/00* (2006.01)

(52) U.S. Cl.
CPC ........ *B29C 39/24* (2013.01); *B29D 11/00442* (2013.01); *B29D 11/00528* (2013.01); *B29D 11/00644* (2013.01); *B32B 37/02* (2013.01); *G02B 5/30* (2013.01); *G02C 7/02* (2013.01); *G02C 7/12* (2013.01); *B29D 11/0073* (2013.01); *B29K 2105/20* (2013.01); *B29K 2629/00* (2013.01); *B29K 2667/00* (2013.01); *B29K 2995/0034* (2013.01); *G02C 2202/16* (2013.01)

(56) References Cited

U.S. PATENT DOCUMENTS

| | | | |
|---|---|---|---|
| 8,147,946 B2 | 4/2012 | Kato | |
| 8,187,712 B2 | 5/2012 | Ryu et al. | |
| 9,581,832 B2 | 2/2017 | Pugh et al. | |
| 2001/0028435 A1* | 10/2001 | Evans | B29C 33/0061 351/159.56 |
| 2003/0099783 A1* | 5/2003 | Karita | B29C 39/10 427/558 |
| 2006/0103041 A1* | 5/2006 | Su | B29D 11/00413 264/2.5 |
| 2007/0241313 A1 | 10/2007 | Kato | |
| 2008/0224338 A1* | 9/2008 | Zinner | B29D 11/00413 264/1.7 |
| 2009/0091825 A1* | 4/2009 | Saito | G02B 1/115 359/488.01 |
| 2009/0201584 A1 | 8/2009 | Ryu et al. | |
| 2010/0012262 A1* | 1/2010 | Hsu | B29D 11/0073 156/245 |
| 2010/0328767 A1 | 12/2010 | Kato | |
| 2012/0090776 A1 | 4/2012 | Hsu | |
| 2013/0155507 A1* | 6/2013 | Ryu | C09B 47/00 359/487.02 |
| 2014/0268020 A1 | 9/2014 | Pugh et al. | |
| 2014/0293217 A1* | 10/2014 | Ogaya | B29C 39/10 351/159.56 |
| 2015/0015973 A1 | 1/2015 | Nagai et al. | |

FOREIGN PATENT DOCUMENTS

| | | | |
|---|---|---|---|
| EP | 2796907 A1 | 10/2014 | |
| JP | 54-128356 A | 10/1979 | |
| JP | S59-36244 B2 | 9/1984 | |
| JP | S62-13308 A | 1/1987 | |
| JP | 2005-099687 A | 4/2005 | |
| JP | 2007-164030 A | 6/2007 | |
| JP | 2007-168310 A | 7/2007 | |
| JP | 2008-093825 A | 4/2008 | |
| JP | 2008-281791 A | 11/2008 | |
| JP | 2009-003303 A | 1/2009 | |
| JP | 2009-045886 A | 3/2009 | |
| JP | 2009-103773 A | 5/2009 | |
| JP | 2014-182393 A | 9/2014 | |
| KR | 10-2014-0113535 A | 9/2014 | |
| WO | WO-9423929 A1 * | 10/1994 | B29C 45/16 |
| WO | WO 2009/098886 A1 | 8/2009 | |

OTHER PUBLICATIONS

JP2007-164030A Google Translation, performed Aug. 2018. (Year: 2018).*
International Search Report (PCT/ISA/210) dated Mar. 29, 2016, by the Japanese Patent Office as the International Searching Authority for International Application No. PCT/JP2016/050938.
Written Opinion (PCT/ISA/237) dated Mar. 29, 2016, by the Japanese Patent Office as the International Searching Authority for International Application No. PCT/JP2016/050938.
International Preliminary Report on Patentability (Form PCT/IPEA/409) dated May 31, 2017, in the corresponding International Application No. PCT/JP2016/050938. (with English translation) (20 pages).
Notification of Reason for Refusal issued by the Korean Intellectual Property Office in corresponding Korean Patent Application No. 10-2017-7026342 dated Jan. 24, 2018 (17 pages including partial English translation).
Extended Search Report issued by the European Patent Office in corresponding European Patent Application No. 16761351.2-1014 dated Oct. 19, 2018 (11 pages).
Preliminary Office Action dated Feb. 27, 2020, by the Brazilian Patent Office in corresponding Brazilian Patent Application No. BR112017019046-0 and an informal partial English translation of the preliminary Office Action. (6 pages).

* cited by examiner

METHOD OF MANUFACTURING PLASTIC LENS, METHOD OF POSITIONING FILM, AND COMPOSITE BODY

TECHNICAL FIELD

The present invention relates to a method of manufacturing a plastic lens, a method of positioning a film, and a composite body. More particularly, the invention relates to a method of manufacturing a plastic polarizing lens, a method of positioning a polarizing film, and a laminated composite body.

BACKGROUND ART

A polarizing lens can prevent the transmission of reflected light. Therefore, the polarizing lens is used for protection of the eyes by blocking strong reflected light in the outdoors such as ski resorts and fishing places, and for securing safety by blocking reflected light from an oncoming car during an automobile driving, and the like.

As a plastic polarizing lens, a polarizing lens having a sandwich structure in which plastic lens substrates are provided on both sides of a polarizing film has been proposed. In the case of a plastic polarizing lens for vision correction, generally, a lens supplier manufactures a semi-finished polarizing lens in which a polarizing film is placed as close as possible to the objective surface (convex surface of a front side) of the lens. Next, the eyepiece surface (concave surface of a back side) of the semi-finished polarizing lens is polished at a processing place called a laboratory or a retail store, so as to process the semi-finished polarizing lens into a polarizing lens having a desired degree. In the manufacture of the semi-finished polarizing lens, it is extremely important to set the polarization film at a position as close as possible to the objective surface of a lens. When the polarizing film is set at a position deeper than the objective surface of the lens, an eyeglass lens becomes thick, and impairs an aesthetic appearance. When the polarizing film is set unevenly and there is a variation in the distance from the objective surface, many defects of the polarizing film being exposed from the eyepiece surface occur during a back surface polishing process of processing the polarizing film into a lens having a desired degree. For this reason, attempts have been conventionally conducted to accurately place the polarizing film as close as possible to the objective surface of a lens.

For example, Patent Document 1 or Patent Document 2 discloses a method of positioning a polarizing film by using a unique mold having a member for separating the polarizing film and the mold by a predetermined distance.

Patent Document 3 or Patent Document 4 discloses a method of positioning a polarizing film by using a gasket member having a shape for separating the polarizing film and a mold by a predetermined distance.

Patent Document 5 discloses a method of positioning a polarizing film by allowing the outer edge of the polarizing film to have a predetermined shape and fixing the polarizing film in a mold by the shape.

Patent Document 6 discloses a method of positioning a polarizing film, in which a polarizing film having a plurality of resin protrusions of approximately the same height is used at the positions opposite to front and back surfaces, and two mold substrates are brought into contact with the resin protrusions from both surfaces of the polarizing film, thereby positioning the polarizing film.

Patent Document 7 discloses a method of positioning a polarizing film with an interval holding ring after moving the polarizing film while adsorbing and holding the polarizing film with an adsorptive pad for suppressing the curling of the polarizing film, and then placing this polarizing film in a mold.

Patent Document 8 discloses a method of manufacturing a polarizing lens by placing a polarizing film on a resin monomer layer in an unrestrained and free state in order to suppress the internal stress generated in the vicinity of the polarizing film, pressing the placed polarizing film with a mold in a thickness direction to form a lens shape, and curing the composition.

Patent Document 9 discloses a method of manufacturing an ophthalmic lens, the method including a process of precuring a reactive monomer mixture in order to fix and hold a rigid insert in proximity to an anterior curve mold.

Patent Document 10 discloses a method of forming a polarizing lens, in which a lens material is pressurized and spread by a lens substrate, and then the lens material is cured, thereby forming a polarizing lens on surface of the lens substrate. It is also described that the lens substrate can be formed from a polarizing sheet.

RELATED DOCUMENT

Patent Document

Patent Document 1: Japanese Laid-open patent publication NO. 2005-99687
Patent Document 2: Japanese Laid-open patent publication NO. 2007-168310
Patent Document 3: Japanese Laid-open patent publication NO. 2008-93825
Patent Document 4: Japanese Laid-open patent publication NO. 2009-45886
Patent Document 5: Japanese Laid-open patent publication NO. 2008-281791
Patent Document 6: Japanese Laid-open patent publication NO. 2009-3303
Patent Document 7: Japanese Laid-open patent publication NO. 2009-103773
Patent Document 8: Japanese Laid-open patent publication NO. 54-128356
Patent Document 9: Japanese Laid-open patent publication NO. 2014-182393
Patent Document 10: Japanese Laid-open patent publication NO. 2007-164030

DISCLOSURE OF THE INVENTION

Problem to be Solved by the Invention

However, in the methods of Patent Documents 1 to 7, it is necessary to prepare a mold of a specific shape or a gasket of a specific shape, and it is necessary to process a polarizing film to have a predetermined shape, so that a manufacturing process is complicated, and there is still room for improvement in reducing a manufacturing cost.

In the method of Patent Document 8, a film is placed on a resin monomer layer in an unrestrained and free state, and the position of the film sometimes moves due to pressing by a mold.

Further, in the methods of Patent Documents 1 to 7, even when the polarizing film is set in a state in which the distance from the objective surface varies, it is very difficult to confirm a defect in the obtained semi-finished polarizing lens. When the defect cannot be confirmed in the semi-finished polarizing lens, a defect of the polarizing film being exposed from the eyepiece surface will be discovered when polishing is performed at a laboratory or a retail store, which will result in a loss of credibility from a customer. Even when the defect in the position of the polarizing film can be confirmed before shipping to the customer, in order to improve the yield and productivity of products, it was desired to previously check the defect due to the position of the polarizing film at the step before the semi-finished polarizing lens is obtained.

Means for Solving Problem

That is, the invention is described as follows.

[1] A method of manufacturing a plastic lens, including:

a step of putting a first curable composition over a forming surface of a first mold substrate having the forming surface for forming a lens surface;

a step of spreading the first curable composition over the entire forming surface by pressing the composition with a film to form a first curable composition layer and separating the film from the first mold substrate by a predetermined distance through the formed first curable composition layer;

a step of covering an outer edge of the first mold substrate, an outer edge of the film, and an outer edge of a second mold substrate having a forming surface for forming the other surface of the lens with a fastening member to support them and to place the second mold substrate so as to be opposed to the film with being spaced apart from the film by a predetermined distance;

a step of injecting a second curable composition into a cavity between the film and the second mold substrate;

a step of curing the first curable composition layer and the injected second curable composition to form substrate layers over both sides of the film; and a step of removing the fastening member, the first mold substrate and the second mold substrate to obtain a plastic lens.

[2] A method of manufacturing a plastic lens, including:

a step of putting a first curable composition over a forming surface of a first mold substrate having the forming surface for forming a lens surface;

a step of spreading the first curable composition over the entire forming surface by pressing the composition with a film to form a first curable composition layer and separating the film from the first mold substrate by a predetermined distance through the formed first curable composition layer;

a step of covering an outer edge of the first mold substrate, an outer edge of the film, and an outer edge of a second mold substrate having a forming surface for forming the other surface of the lens with a fastening member to support them and to place the second mold substrate so as to be opposed to the film with being spaced apart from the film by a predetermined distance;

a step of semi-curing the first curable composition layer;

a step of injecting a second curable composition into a cavity between the film and the second mold substrate;

a step of curing the semi-cured first curable composition layer and the injected second curable composition to form substrate layers over both sides of the film; and a step of removing the fastening member, the first mold substrate and the second mold substrate to obtain a plastic lens.

[3] The method of manufacturing a plastic lens according to [2], wherein the step of semi-curing the first curable composition layer is a step of semi-curing the first curable composition layer such that the position of the film does not move at a position spaced apart from the forming surface of the first mold substrate by 0.1 mm to 3.0 mm.

[4] The method of manufacturing a plastic lens according to [2] or [3], wherein the storage elastic modulus of the semi-cured first curable composition at 20° C. is 0.01 Pa to 100,000 Pa.

[5] The method of manufacturing a plastic lens according to [2] or [3], wherein the storage elastic modulus of the semi-cured first curable composition at 20° C. is 0.1 Pa to 1,000 Pa.

[6] The method of manufacturing a plastic lens according to [2] or [3], wherein the first curable composition is a (thio)urethane material, and the polymerization degree of the semi-cured first curable composition is 30% to 70%.

[7] The method of manufacturing a plastic lens according to any one of [2] to [6], wherein, in the step of putting the first curable composition, the viscosity of the first curable composition at 20° C., measured by a B type viscometer, is 1 mPa·s to 500 mPa·s.

[8] A method of manufacturing a plastic lens, including:

a step of putting a first curable composition having a viscosity of 1,000 mPa·s to 100,000 mPa·s over a forming surface of a first mold substrate having the forming surface for forming a lens surface;

a step of spreading the first curable composition over the entire forming surface by pressing the composition with a film to form a first curable composition layer and separating the film from the first mold substrate by a predetermined distance through the formed first curable composition layer;

a step of covering an outer edge of the first mold substrate, an outer edge of the film, and an outer edge of a second mold substrate having a forming surface for forming the other surface of the lens with a fastening member to support them and to place the second mold substrate so as to be opposed to the film with being spaced apart from the film by a predetermined distance;

a step of injecting a second curable composition into a cavity between the film and the second mold substrate;

a step of curing the first curable composition layer and the injected second curable composition to form substrate layers over both sides of the film; and a step of removing the fastening member, the first mold substrate and the second mold substrate to obtain a plastic lens.

[9] The method of manufacturing a plastic lens according to any one of [1] to [8], further including:

a step of putting a spacer for positioning the film over the forming surface of the first mold substrate before or after the step of putting the first curable composition over the forming surface of the first mold substrate.

[10] The method of manufacturing a plastic lens according to [9], wherein the spacer has a ring shape, and is placed along an outer peripheral edge over the forming surface of the first mold substrate.

[11] The method of manufacturing a plastic lens according to any one of [1] to [10], wherein the fastening member is a tape or a gasket.

[12] The method of manufacturing a plastic lens according to any one of [1] to [11], wherein the film is a shaped polarizing film.

[13] The method of manufacturing a plastic lens according to [12], wherein the polarizing film is a polyvinyl alcohol film or a thermoplastic polyester film.

[14] A method of positioning a film, including:

a step of putting a curable composition over a forming surface of a mold substrate having the forming surface for forming a lens surface;

a step of spreading the curable composition over the entire forming surface by pressing the composition with a film to form a curable composition layer and separating the film from the mold substrate by a predetermined distance through the formed curable composition layer; and a step of semi-curing the curable composition.

[15] The method of positioning a film according to [14], wherein the step of semi-curing the curable composition layer is a step of semi-curing the curable composition layer such that the position of the film does not move at a position spaced apart from the forming surface of the mold substrate by 0.1 mm to 3.0 mm.

[16] A method of positioning a film, including:

a step of putting a first curable composition having a viscosity of 1,000 mPa·s to 100,000 mPa·s over a forming surface of a first mold substrate having the forming surface for forming a lens surface; and a step of spreading the first curable composition over the entire forming surface by pressing the composition with a film to form a first curable composition layer and separating the film from the first mold substrate by a predetermined distance through the formed first curable composition layer.

[17] The method of positioning a film according to any one of [14] to [16], wherein the film is a shaped polarizing film.

[18] A composite body in which a mold substrate having a forming surface for forming a lens surface, a semi-cured curable composition layer formed over the entire forming surface of the mold substrate, and a film are laminated in this order.

[19] A composite body in which a mold substrate having a forming surface for forming a lens surface, a first curable composition layer having a viscosity of 1,000 mPa·s to 100,000 mPa·s and formed over the entire forming surface of the mold substrate, and a film are laminated in this order.

[20] The composite body according to [18] or [19], wherein the film is a shaped polarizing film.

In the invention, semi-curing means a state where fluidity is lost in the process in which a liquid curable composition is polymerized into a resin (a state where a curable composition does not move even when the curable composition of about 1 g is put on a glass plate and tilted to about 45°). In terms of numerical values, the semi-curing means a state where storage elastic modulus at 20° C. is in the range of approximately 0.01 Pa to 100,000 Pa. When the curable composition is a (thio)urethane-based material, the semi-curing means a state where polymerization degree is in the range of approximately 30% to 70%. The polymerization degree was analyzed and measured by differential thermal analysis on what percentage of heat generation occurred with respect to the total calorific value from starting polymerization to the completion of polymerization (the completion of the generation of polymerization).

Effect of the Invention

According to the method for manufacturing a plastic lens of the invention, a curable composition is evenly pressed with a film, and spread out over the entire surface of a forming surface of a mold substrate, so that the mold substrate and the film can be spaced apart from each other by a predetermined distance through the curable composition. Further, since no stress is applied to the film, the film can be surely positioned by a simple method, the occurrence of defective products can be suppressed, and the manufacturing cost can be further reduced.

Further, according to the method of positioning a film of the invention, since it is possible to easily check the distance between a polarizing film and an objective surface side and the variation thereof at an intermediate step before obtaining a semi-finished lens, it is possible to improve the yield and productivity of products, and it is possible to drastically reduce the defect of the polarizing film being exposed from an eyepiece surface at a laboratory or retail shop.

The method of manufacturing a plastic lens according to the invention or the method of positioning a film according to the invention can be usefully applied not only to a case of manufacturing through a semi-finished lens but also to a case of directly manufacturing a lens of a desired degree (finished lens) or a case of manufacturing a lens without optical correction for sunglasses.

BRIEF DESCRIPTION OF THE DRAWINGS

The above and other objects, advantages and features of the invention will be more apparent from the following description of certain preferred embodiments taken in conjunction with the accompanying drawings, in which.

DESCRIPTION OF EMBODIMENTS

Figure 1:
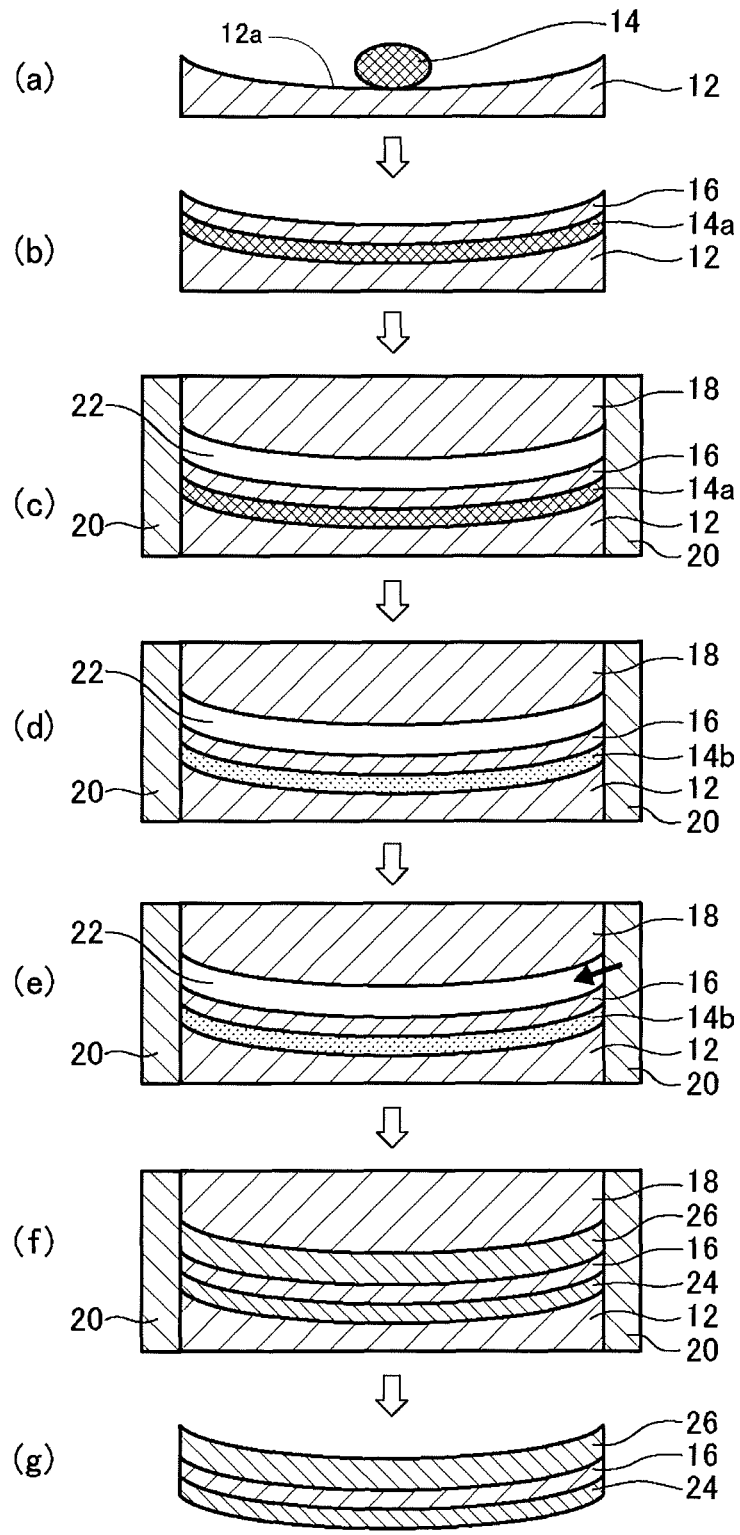
FIG. 1 is a schematic process sectional view showing a method of manufacturing a plastic lens according to a first embodiment.

Hereinafter, embodiments of the invention will be described with reference to the drawings. In all the drawings, similar components are denoted by the same reference numerals, and description thereof will not be repeated.

The "positioning of a film" in the invention means setting the placement position of the film in a lens using the film.

A method of manufacturing a plastic lens according to the invention includes:

a step of putting a first curable composition over a forming surface of a first mold substrate having the forming surface for forming a lens surface;

a step of spreading the first curable composition over the entire forming surface by pressing the composition with a film to form a first curable composition layer and separating the film from the first mold substrate by a predetermined distance through the formed first curable composition layer;

a step of covering an outer edge of the first mold substrate, an outer edge of the film, and an outer edge of a second mold substrate having a forming surface for forming the other surface of the lens with a fastening member to support them and to place the second mold substrate so as to be opposed to the film with being spaced apart from the film by a predetermined distance;

a step of injecting a second curable composition into a cavity between the film and the second mold substrate;

a step of curing the first curable composition layer and the injected second curable composition to form substrate layers over both sides of the film; and a step of removing the fastening member, the first mold substrate and the second mold substrate to obtain a plastic lens.

As embodiments of the invention, an embodiment of semi-curing the first curable composition layer (first or second embodiment) and an embodiment of using the first curable composition having a predetermined viscosity (third or fourth embodiment) may be exemplified.

Hereinafter, these embodiments will be described in order.

First Embodiment

The method of manufacturing a plastic lens according to this embodiment includes the following steps.

Step a: a predetermined amount of a first curable composition 14 is put over a forming surface 12a of a first mold substrate 12 having the forming surface 12a for forming an objective surface of a lens (FIG. 1(a)).

Step b: the first curable composition 14 is spread over the entire forming surface 12a by pressing the composition 14 with a film 16 to form a first curable composition layer 14a, and the first mold substrate 12 and the film 16 are separated from each other by a predetermined distance through the first curable composition layer 14a (FIG. 1(b)).

Step c: an outer edge of the first mold substrate 12, an outer edge of the film 16, and an outer edge of a second mold substrate 18 having a forming surface for forming the other surface of the lens are covered with a fastening member 20 to support them in place, and the second mold substrate 18 is placed so as to be opposed to the film 16 with being spaced apart from the film 16 by a predetermined distance (FIG. 1(c)).

Step d: the first curable composition layer 14a is semi-cured to form a semi-cured layer 14b (FIG. 1(d)).

Step e: a second curable composition is injected into a cavity 22 between the film 16 and the second mold substrate 18 (FIG. 1(e)).

Step f: the semi-cured layer 14b of the first curable composition and the injected second curable composition are cured to form substrate layers 24 and 26 over both sides of the film 16 (FIG. 1(f)).

Step g: the fastening member 20, the first mold substrate 12, and the second mold substrate 18 are removed to obtain a plastic lens (FIG. 1(g)).

(Step a)

First, a predetermined amount of a first curable composition 14 is put over a forming surface 12a of a first mold substrate 12 having the forming surface 12a for forming an objective surface of a lens.

The first mold substrate 12 is generally made of glass.

The forming surface 12a of the first mold substrate 12 is a concave surface having a predetermined curved surface shape. In this embodiment, an example in which the forming surface 12a is a concave surface for forming the objective surface (convex surface) of the lens will be described. The forming surface 12a may be a convex surface for forming the objective surface (concave surface) of the lens.

The first curable composition 14 is obtained by mixing a monomer with an additive such as a catalyst and, if necessary, performing degassing, filtering, and the like. In this embodiment, the curable composition may also be referred to as a polymerizable composition.

The monomer is not particularly limited as long as it is a cast-polymerizable monomer, and examples thereof include a (thio)urethane-based monomer, an allylic monomer, an episulfide-based monomer, a (meth)acrylic monomer, a urethane urea monomer, and an epoxy-based monomer. These monomers may be mixed and then used.

The (thio)urethane-based monomer is a mixture of an iso(thio)cyanate compound and an active hydrogen compound. Examples of the iso(thio)cyanate compound may include aliphatic polyisocyanate compounds, such as hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, α,α,α',α'-tetramethylxylylene diisocyanate, bis(isocyanatomethyl)naphthalene, mesitylene triisocyanate, bis(isocyanatomethyl) sulfide, bis(isocyanatoethyl) sulfide, bis(isocyanatomethyl) disulfide, bis(isocyanatoethyl) disulfide, bis(isocyanatomethylthio) methane, bis(isocyanatoethylthio)methane, bis(isocyanatoethylthio)ethane, and bis(isocyanatomethylthio)ethane; alicyclic polyisocyanate compounds, such as isophorone diisocyanate, bis(isocyanatomethyl) cyclohexane, dicyclohexylmethane-4,4'-diisocyanate, cyclohexane diisocyanate, methylcyclohexane diisocyanate, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane; aromatic polyisocyanate compounds, such as 2,4-tolylene diisocyanate, 2,6-tolylene diisocyanate, 4,4'-diphenylmethane diisocyanate, and diphenyl sulfide-4,4-diisocyanate; and heterocyclic polyisocyanate compounds, such as 2,5-diisocyanatothiophene, 2,5-bis(isocyanatomethyl) thiophene, 2,5-diisocyanatotetrahydrothiophene, 2,5-bis(isocyanatomethyl)tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane.

Examples of the active hydrogen compound include a polyol compound and a polythiol compound. Examples of the polyol compound may include one or more kinds of aliphatic or alicyclic alcohols, and specific examples thereof may include linear or branched aliphatic alcohols, alicyclic alcohols, and alcohols obtained by adding ethylene oxide, propylene oxide or ε-caprolactone to these alcohols.

Examples of the linear or branched aliphatic alcohols may include ethylene glycol, diethylene glycol, triethylene glycol, propylene glycol, dipropylene glycol, tripropylene glycol, 1,3-propanediol, 2,2-dimethyl-1,3-propanediol, 2,2-diethyl-1,3-propanediol, 1,2-butanediol, 1,3-butanediol, 1,4-butanediol, 3-methyl-1,3-butanediol, 1,2-pentanediol, 1,3-pentanediol, 1,5-pentanediol, 2,4-pentanediol, 2-methyl-2,4-pentanediol, 3-methyl-1,5-pentanediol, 1,6-hexanediol, 2,5-hexanediol, glycerol, diglycerol, polyglycerol, trimethylolpropane, pentaerythritol, and di(trimethylolpropane).

Examples of the alicyclic alcohols may include 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 4,4'-bicyclohexanol, and 1,4-cyclohexanedimethanol.

Compounds obtained by adding ethylene oxide, propylene oxide or ε-caprolactone to these alcohols may be used. Examples of the compounds may include an ethylene oxide adduct of glycerol, an ethylene oxide adduct of trimethylolpropane, an ethylene oxide adduct of pentaerythritol, a propylene oxide adduct of glycerol, a propylene oxide adduct of trimethylolpropane, a propylene oxide adduct of pentaerythritol, caprolactone-modified glycerol, caprolactone-modified trimethylolpropane, and caprolactone-modified pentaerythritol.

Examples of the polythiol compound may include aliphatic polythiol compounds, such as methanedithiol, 1,2- ethanedithiol, 1,2,3-propanetrithiol, 1,2-cyclohexanedithiol, bis(2-mercaptoethyl) ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptopropionate), trimethylolethane tris(3-mercaptopropionate), pentaerythritol tetrakis(2-mercaptoacetate), pentaerythritol tetrakis(3-mercaptopropionate), bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptomethylthio)methane, bis(2-mercaptoethylthio) methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio) propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl) methane, tetrakis(2-mercaptoethylthiomethyl) methane, tetrakis(3-mercaptopropylthiomethyl) methane, bis(2,3-dimercaptopropyl) sulfide, 2,5-dimercaptomethyl-1,4-dithiane, 2,5-dimercapto-1,4-dithiane, 2,5-dimercaptomethyl-2,5-dimethyl-1,4-dithiane, and esters of thioglycolic acid and mercaptopropionic acid thereof, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptoprinate), 2-mercaptoethyl ether bis(2-mercaptoacetate), 2-mercaptoethyl ether bis(3-mercaptopropionate), thiodiglycolic acid bis(2-mercaptoethyl ester), thiodiglycolic acid bis(2-mercaptoethyl ester), dithiodipropionic acid bis(2-mercaptoethyl ester), dithiodipropionic acid bis(2-mercaptoethylester), 1,1,3,3-tetrakis(methylcaptomethylthio)propane, 1,1,2,2-tetrakis(mercaptomethylthio) ethane, 4,6-bis(mercaptomethylthio)-1,3-dithiane, tris(mercaptomethylthio)methane, and tris(mercaptoethylthio)methane; aromatic polythiol compounds, such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptoethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; and heterocyclic polythiol compounds, such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio) ethyl)-1,3-dithietane.

Examples of the allylic monomer may include allyl diglycol carbonate (diethylene glycol diallyl carbonate), neopentyl glycol diallyl carbonate, allyl carbonate of pentaerythritol, and diallyl phthalate.

Examples of the episulfide-based monomer may include epithioethylthio compounds, such as bis(1,2-epithioethyl) sulfide, bis(1,2-epithioethyl) disulfide, bis(epithioethylthio) methane, bis(epithioethylthio)benzene, bis[4-(epithioethylthio)phenyl] sulfide, and bis[4-(epithioethylthio)phenyl] methane; linear aliphatic 2,3-epithiopropylthio compounds, such as bis(2,3-epithiopropyl) sulfide, bis(2,3-epithiopropyl) disulfide, bis(2,3-epithiopropylthio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methyl propane, 1,4-bis(2,3-epithiopropylthio)butane, 1-4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio) 2-methyl pentane, 1,5-bis(2,3-epithiopropylthio)-3-thiapentane, 1,6-bis(2,3-epithiopropylthio)hexane, 1,6-bis(2,3-epithiopropylthio)-2-methylhexane, 1,8-bis(2,3-epithiopropylthio)-3,6-dithiaoctane, 1,2,3-tris(2,3-epithiopropylthio)propane, 2,2-bis(2,3-epithiopropylthio)-1,3-bis(2,3-epithiopropylthiomethyl)propane, 2,2-bis(2,3-epithiopropylthiomethyl)-1-(2,3-epithiopropylthio)butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-3,6-dithiaoctane, 1,1,1-tris[[2-(2,3-epithiopropylthio)ethyl]thiomethyl]-2-(2,3-epithiopropylthio)ethane, 1,1,2,2-tetrakis[[2-(2,3-epithiopropylthio)ethyl]thiomethyl]ethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, and 1,11-bis(2,3-epithiopropylthio)-5,7-bis(2,3-epithiopropylthiomethyl)-3,6,9-trithiaundecane; cyclic aliphatic 2,3-epithiopropylthio compounds, such as 1,3-bis(2,3-epithiopropylthio)cyclohexane, 1,4-bis(2,3-epithiopropylthio)cyclohexane, 1,3-bis(2,3-epithiopropylthiomethyl) cyclohexane, 1,4-bis(2,3-epithiopropylthiomethyl) cyclohexane, 2,5-bis(2,3-epithiopropylthiomethyl)-1,4-dithiane, 2,5-bis[[2-(2,3-epithiopropylthio)ethyl]thiomethyl]-1,4-dithiane, and 2,5-bis(2,3-epithiopropylthiomethyl)-2,5-dimethyl-1,4-dithiane;

aromatic 2,3-epithiopropylthio compounds, such as 1,2-bis(2,3-epithiopropylthio) benzene, 1,3-bis(2,3-epithiopropylthio)benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis[4-(2,3-epithiopropylthio)phenyl]methane, 2,2-bis[4-(2,3-epithiopropylthio)phenyl]propane, bis[4-(2,3-epithiopropylthio)phenyl] sulfide, bis[4-(2,3-epithiopropylthio)phenyl]sulfone, and 4,4'-bis(2,3-epithiopropylthio)biphenyl;

linear aliphatic 2,3-epithiopropyloxy compounds, such as bis(2,3-epithiopropyl) ether, bis(2,3-epithiopropyloxy) methane, 1,2-bis(2,3-epithiopropyloxy) ethane, 1,2-bis(2,3-epithiopropyloxy)propane, 1,3-bis(2,3-epithiopropyloxy) propane, 1,3-bis(2,3-epithiopropyloxy)-2-methyl propane, 1,4-bis(2,3-epithiopropyloxy)butane, 1,4-bis(2,3-epithiopropyloxy)-2-methyl butane, 1,3-bis(2,3-epithiopropyloxy) butane, 1,5-bis(2,3-epithiopropyloxy)pentane, 1,5-bis(2,3-epithiopropyloxy)-2-methyl pentane, 1,5-bis(2,3- epithiopropyloxy)-3-thiapentane, 1,6-bis(2,3-epithiopropyloxy)hexane, 1,6-bis(2,3-epithiopropyloxy)-2-methyl hexane, 1,8-bis(2,3-epithiopropyloxy)-3,6-dithiaoctane, 1,2,3-tris(2,3-epithiopropyloxy)propane, 2,2-bis(2,3-epithiopropyloxy)-1,3-bis(2,3-epithiopropyloxymethyl)propane, 2,2-bis(2,3-epithiopropyloxymethyl)-1-(2,3-epithiopropyloxy)butane, 1,5-bis(2,3-epithiopropyloxy)-2-(2,3-epithiopropyloxymethyl)-3-thiapentane, 1,5-bis(2,3-epithiopropyloxy)-2,4-bis(2,3-epithiopropyloxymethyl)-3-thiapentane, 1-(2,3-epithiopropyloxy)-2,2-bis(2,3-epithiopropyloxymethyl)-4-thiahexane, 1,5,6-tris(2,3-epithiopropyloxy)-4-(2,3-epithiopropyloxymethyl)-3-thiahexane, 1,8-bis(2,3-epithiopropyloxy)-4-(2,3-epithiopropyloxymethyl)-3,6-dithiaoctane, 1,8-bis(2,3-epithiopropyloxy)-4,5-bis(2,3-epithiopropyloxymethyl)-3,6-dithiaoctane, 1,8-bis(2,3-epithiopropyloxy)-4,4-bis(2,3-epithiopropyloxymethyl)-3,6-dithiaoctane, 1,8-bis(2,3-epithiopropyloxy)-2,5-bis(2,3-epithiopropyloxymethyl)-3,6-dithiaoctane, 1,8-bis(2,3-epithiopropyloxy)-2,4,5-tris(2,3-epithiopropyloxymethyl)-3,6-dithiaoctane, 1,1,1-tris[[2-(2,3-epithiopropyloxy)ethyl]thiomethyl]-2-(2,3-epithiopropyloxy) ethane, 1,1,2,2-tetrakis[[2-(2,3-epithiopropyloxy)ethyl]thiomethyl]ethane, 1,11-bis(2,3-epithiopropyloxy)-4,8-bis(2,3-epithiopropyloxymethyl)-3,6,9-trithiaundecane, 1,11-bis(2,3-epithiopropyloxy)-4,7-bis(2,3-epithiopropyloxymethyl)-3,6,9-trithiaundecane, and 1,11-bis(2,3-epithiopropyloxy)-5,7-bis(2,3-epithiopropyloxymethyl)-3,6,9-trithiaundecane; cyclic aliphatic 2,3-epithiopropyloxy compounds, such as 1,3-bis(2,3-epithiopropyloxy)cyclohexane, 1,4-bis(2,3-epithiopropyloxy)cyclohexane, 1,3-bis(2,3-epithiopropyloxymethyl)cyclohexane, 1,4-bis(2,3-epithiopropyloxymethyl)cyclohexane, 2,5-bis(2,3-epithiopropyloxymethyl)-1,4-dithiane, and 2,5-bis[[2-(2,3-epithiopropyloxy)ethyl]thiomethyl]-1,4-dithiane, and 2,5-bis(2,3-epithiopropyloxymethyl)-2,5-dimethyl-1,4-dithiane; and aromatic 2,3-epithiopropyloxy compounds, such as 1,2-bis(2,3-epithiopropyloxy)benzene, 1,3-bis(2,3-epithiopropyloxy)benzene, 1,4-bis(2,3-epithiopropyloxy)benzene, 1,2-bis(2,3-epithiopropyloxymethyl)benzene, 1,3-bis(2,3-epithiopropyloxymethyl)benzene, 1,4-bis(2,3-epithiopropyloxymethyl)benzene, bis[4-(2,3-epithiopropyloxy)phenyl]methane, 2,2-bis[4-(2,3-epithiopropyloxy)phenyl]propane, bis[4-(2,3-epithiopropyloxy)phenyl] sulfide, bis[4-(2,3-epithiopropyloxy)phenyl]sulfone, and 4,4'-bis(2,3-epithiopropyloxy)biphenyl.

The episulfide monomer is sometimes used together with an active hydrogen compound such as a polythiol.

Examples of the (meth)acrylic monomer may include poly(meth)acrylates of alkane polyols, such as ethylene glycol di(meth)acrylate, propylene glycol di(meth)acrylate, butylene glycol di(meth)acrylate, neopentyl glycol di(meth)acrylate, hexylene glycol di(meth)acrylate, trimethylolpropane tri(meth)acrylate, pentaerythritol tetra(meth)acrylate; and polyoxyalkane polyol poly(meth)acrylates, such as diethylene glycol di(meth)acrylate, triethylene glycol di(meth)acrylate, polyethylene glycol di(meth)acrylate, dipropylene glycol di(meth)acrylate, polypropylene glycol di(meth)acrylate, dibutylene glycol di(meth)acrylate, and dipentaerythritol hexa(meth)acrylate.

The (meth) acrylic monomer is sometimes used together with an active hydrogen compound such as polythiol and an allylic monomer.

The urethane urea-based monomer is a mixture of an iso(thio)cyanate compound, an amine compound, and an active hydrogen compound. The iso(thio)cyanate compound or the active hydrogen compound may include the above-described compounds. The amino compounds may include ethylene diamine, diethylene triamine, triethylene triamine, tetraethylene pentamine, pentaethylene hexamine, piperazine, morpholine, substituted morpholine, piperidine, substituted piperidine, diethylene diamine, 2-amino-1-ethyl piperazine, 2,4-diamino-3,5-diethyl toluene, 2,6-diamino-3,5-diethyl toluene, diisopropyltoluene diamine, methylene dianiline, dimethylthiotoluene diamine, 4,4'-methylene-bis(2-chloroaniline), 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline), and 4,4'-methylene-bis(3-chloro-2,6-diethylaniline), and the like.

Examples of the epoxy-based monomer may include a phenolic epoxy compound obtained by the condensation reaction of a polyvalent phenol compound, such as bisphenol A glycidyl ether or bisphenol F glycidyl ether, and an epihalohydrin compound; an alcoholic epoxy compound obtained by the condensation of an polyhydric alcohol compound, such as hydrogenated bisphenol A glycidyl ether, hydrogenated bisphenol F glycidyl ether, or cyclohexane dimethanol, and an epihalohydrin compound; a glycidyl ester-based epoxy compound obtained by the condensation of a polyvalent organic acid compound, such as 3,4-epoxycyclohexylmethyl-3',4'-epoxycyclohexane carboxylate or 1,2-hexahydrophthalic acid diglycidyl ester, and an epihalohydrin compound; and an amine-based epoxy compound obtained by the condensation of a primary or secondary amine compound and an epihalohydrin compound. In addition, aliphatic polyvalent epoxy compounds, such as vinyl cyclohexene diepoxide (for example, 4-vinyl-1-cyclohexane diepoxide) and the like may be exemplified.

The epoxy type monomers may be used together with active hydrogen compounds such as polythiols and polyamines.

Examples of other monomers include polythietane compounds. Further, a plurality of these monomers may be contained.

As the catalyst, although a catalyst used differs depending on the kind of monomers, a publicly known catalyst can be used.

For example, in the case of the (thio)urethane-based monomer, tin compounds such as dimethyltin dichloride, dibutyltin dichloride, dioctyltin dichloride, dibutyltin dilaurate, and dibutyltin diacetate; and amine compounds such as dicyclohexylmethylamine and dimethylcyclohexylamine are preferably used.

In the case of the allylic monomer or (meth) acrylic monomer, organic peroxides, such as benzoyl peroxide, dicumyl peroxide, lauroyl peroxide, di-t-butyl peroxy azelate, t-butyl peroxy-2-ethyl hexanoate, t-butyl peroxylaurate, t-butyl peroxybenzoate, t-butyl peroxy-3,5,5-trimethyl hexanoate, t-butyl peroxyacetate, diisopropyl peroxydicarbonate, bis(4-t-butylcyclohexyl) peroxydicarbonate, and t-butylperoxyisopropyl carbonate; azo compounds, such as azo-bisisobutyronitrile, 2,2'-azo-bis(2-cyclopropylpropionitrile), 2,2'-azo-bis(4-methoxy-2,4-dimethylvaleronitrile), and 2,2'-azo-bis(2,4-dimethylvaleronitrile); and photopolymerization initiators, such as benzophenone, 4,4-diethylaminobenzophenone, 1-hydroxycyclohexyl phenyl ketone, 2,2-dimethoxy-2-phenylacetophenone, isoamyl p-dimethylaminobenzoate, methyl 4-dimethylaminobenzoate, benzoin, benzoin ethyl ether, benzoin isobutyl ether, and benzoin isopropyl ether, 2,2-diethoxyacetophenone, o-benzoylmethyl benzoate, 2-hydroxy-2-methyl-1-phenylpropan-1-one, 2,4,6-trimethylbenzoyldiphenylphosphine oxide, bisacylphosphine oxide may be used.

In the case of the episulfide-based monomer, tertiary amines, such as triethylamine, tri-n-butylamine, tri-n-hexylamine, N,N-diisopropylethylamine, triethylenediamine, triphenylamine, N,N-dimethylethanolamine, N,N-diethylethanolamine, N,N-dibutylethanolamine, N,N-dimethylbenzylamine, diethylbenzylamine, N,N-dimethylcyclohexylamine, N,N-diethylcyclohexylamine, N-methyldicyclohexylamine, N-methylmorpholine, N-isopropylmorpholine, pyridine, N,N-dimethylaniline, β-picoline, N,N'-dimethylpiperazine, N-methylpiperidine, 2,2'-bipyridyl, hexamethylenetetramine, and 1,8-diazabicyclo[5.4.0]-7-undecene; phosphines, such as trimethylphosphine, triethyiphosphine, tri-n-propylphosphine, triisopropylphosphine, tri-n-butylphosphine, triphenylphosphine, tribenzylphosphine, 1,2-bis(diphenylphosphino)ethane, and 1,2-bis(dimethylphosphino)ethane; quaternary ammonium salts, such as tetramethylammonium bromide, tetrabutylammonium chloride, and tetrabutylammonium bromide; quaternary phosphonium salts, such as tetramethylphosphonium bromide, tetrabutylphosphonium chloride, and tetrabutylphosphonium bromide; Lewis acids, such as dimethyltin dichloride, dibutyltin dichloride, dibutyltin dilaurate, dibutyltin diacetate, tetrachlorotin, dibutyltin oxide, diacetoxytetrabutyldistannoxane, zinc chloride, zinc acetylacetonate, aluminum chloride, aluminum fluoride, triphenylaluminum, tetrachlorotitanium, and calcium acetate; radical polymerization catalysts, such as 2,2'-azo-bis(2-cyclopropylpropionitrile), 2,2'-azo-bis(4-methoxy-2,4-dimethylvaleronitrile), 2,2'-azo-bis(2,4-dimethylvaleronitrile), t-butylperoxy-2-ethylhexanoate, n-butyl-4,4'-bis(t-butylperoxy) valerate, and t-butylperoxy benzoate; cationic polymerization catalysts, such as diphenyliodonium hexafluorophosphate, diphenyliodonium hexafluoroarsenate, diphenyliodonium hexafluoroantimonate, triphenylsulfonium tetrafluoroborate, triphenylsulfonium hexafluorophosphate, and triphenylsulfonium hexafluoroarsenate; and mixtures thereof.

The addition amount of the catalyst is generally in the range of 1 ppm to 5%.

Examples of other additives include an internal release agent, an ultraviolet absorber, a dye, a dimming pigment, and a specific wavelength cut pigment. Examples of the internal release agent include acidic phosphate esters. Specific examples of the internal release agent may include a phosphate monoester and a phosphate diester. They may be used alone or in a combination of two or more. An internal release agent for MR manufactured by Mitsui Chemicals, Inc., ZelecUN manufactured by STEPAN Co., Ltd., JP series manufactured by Johoku Chemical Co., Ltd., Phosphanol series manufactured by TOHO Chemical Industry Co., Ltd., and AP, DP series manufactured by Daihachi Chemical Industry Co., Ltd. are preferable, and an internal release agent for MR manufactured by Mitsui Chemicals, Inc. and ZelecUN manufactured by STEPAN Co., Ltd. are more preferable. The addition amount of the internal release agent is generally in the range of 0.001 parts by weight to 3 parts by weight, and preferably 0.01 parts by weight to 0.5 parts by weight, with respect to 100 parts by weight of the curable composition.

The ultraviolet absorber is preferably a benzotriazole-based compound, a triazine-based compound, a benzophenone-based compound, or a benzoate-based compound, and more preferably a benzotriazole-based compound. The addition amount of the ultraviolet absorber is generally in the range of 0.01 parts by weight to 5 parts by weight, and preferably 0.05 parts by weight to 2 parts by weight, with respect to 100 parts by weight of the curable composition.

The first curable composition 14 is used after mixing a monomer with an additive such as a catalyst, degassing the mixture under a reduced pressure of about 0.1 Torr to 100 Torr for about 0.1 to 5 hours, and filtering the mixture using a filter of about 1 μm to 10 μm.

The viscosity of the first curable composition at 20° C., measured by a B type viscometer, is generally in the range of 1 mPa·s to 500 mPa·s, and preferably in the range of 10 mPa·s to 200 mPa·s. Within this range, it is easy to spread the first curable composition 14 over the forming surface 12a and to uniformly separate the film 16 from the first mold substrate 12.

The amount of putting the first curable composition 14 is calculated from the area of the forming surface 12a, the desired separating distance between the first mold substrate 12 and the film 16, and the specific gravity of the first curable composition. The diameter of the first mold substrate 12 is generally about 60 mm to 90 mm, and the separating distance is generally set within a range of 0.1 mm to 3.0 mm, and preferably 0.2 mm to 2.0 mm.

(Step b)

The first curable composition 14 is spread over the entire forming surface 12a by pressing the composition 14 with a film 16 to form a first curable composition layer 14a, and the first mold substrate 12 and the film 16 are separated from each other by a predetermined distance through the first curable composition layer 14a (FIG. 1(b)).

Examples of the film 16 include a polarizing film, a dimming (photochromic) film, a colored film, and a specific wavelength cut film. Particularly, a polarizing film is preferable.

As the polarizing film, a thermoplastic polyester film such as a polyvinyl alcohol film or polyethylene terephthalate can be exemplified. These polarizing films are uniaxially stretched, and their thickness is generally about 10 μm to 300 μm. The polarizing film may also be used as a sheet laminated with a thermoplastic material such as polycarbonate, triacetyl cellulose, or polyamide.

It is preferable that the film 16 has a predetermined curved surface shape formed at a predetermined temperature. Generally, the film 16 has the same curved surface shape as the forming surface 12a of the first mold substrate 12, but may have a curved surface shape having a curvature radius smaller than that of the forming surface 12a. For the purpose of improving the adhesion strength with the substrate layer, the film may be used after performing one or more pretreatments selected from primer coating treatment, chemical treatment (gas or chemical treatment), corona discharge treatment, plasma treatment, ultraviolet irradiation treatment, electron beam irradiation treatment, roughening treatment, and flame treatment. Among these pretreatments, one or more selected from primer coating treatment, chemical treatment such as alkali treatment, corona discharge treatment, and plasma treatment are particularly preferable.

In the step of spreading the first curable composition 14 over the entire forming surface 12a, there is no particular limitation as long as the entire surface of the film 16 can be pressed from above. Generally, the film is sufficiently pressed by its own weight, but may be pressed from above in a state of being affixed to a pressing member having the same curved surface as the film 16.

It is easily confirmed visually that the first mold substrate 12 and the film 16 are spaced apart from each other by a predetermined distance.

(Step c)

An outer edge of the first mold substrate 12, an outer edge of the film 16, and an outer edge of a second mold substrate 18 having a forming surface for forming the other surface of the lens are covered with a fastening member 20 to support them in place, and the second mold substrate 18 is placed so as to be opposed to the film 16 with being spaced apart from the film 16 by a predetermined distance (FIG. 1(c)).

The second mold substrate 18 is generally made of glass. The second mold substrate 18 may be the same as or different from the first mold substrate 12.

As the fastening member 20, a tape, a gasket, or the like can be exemplified. In the case of a tape, the tape is wound so as to cover the outer edge of the first mold substrate 12, the outer edge of the film 16, and the outer edge of the second mold substrate 18, thereby supporting these components in place.

As the tape, there is used a tape in which an adhesive such as siloxane-based adhesive, (meth)acrylic-based adhesive or epoxy-based adhesive or rubber-based adhesive is applied on a base material such as polyethylene, polypropylene, polyethylene terephthalate, polyethylene isophthalate, polyethylene naphthalate, polyphenylene sulfide, polyester, polycarbonate, polyvinyl chloride, Teflon (registered trademark), polysiloxane resin, polyimide resin, cellulose, and a mixture/copolymer thereof. For the purpose of lowering the water vapor permeability of the tape, for example, a quartz film or the like may be formed by depositing silicon oxide or the like, an organic coating agent, an inorganic coating agent, or a mixture thereof may be applied, or another base material having a low water vapor permeability may be laminated. The thickness of the tape is generally in the range of 10 μm to 200 μm in terms of operability, dimensional stability of a molded product, airtightness near an overlapping portion boundary line, strength, and the like.

As the gasket, generally, a molded product obtained by using a thermoplastic resin can be suitably used. From the viewpoints of moldability, flexibility, heat resistance, monomer stability, price, and the like, it is preferable to use an olefinic elastomer. Specific examples of the olefinic elastomer include a polyethylene-based elastomer made of low density polyethylene, a polypropylene-based elastomer in which a rubber component is finely dispersed in a polypropylene homopolymer, an ethylene-vinyl acetate copolymer, and an ethylene-alkyl acrylate copolymer.

The gasket used in this embodiment does not need to have a special shape as described in Patent Document 3 or Patent Document 4, and a gasket having a normal shape used for manufacturing a normal lens not sandwiching a film can be directly used as the gasket.

Thus, a cavity 22 surrounded by the film 16, the second mold substrate 18, and the fastening member 20 is formed.

(Step d)

The first curable composition 14 is semi-cured to form a semi-cured layer 14b (FIG. 1(d)).

Thus, the film 16 can be positioned. Semi-curing refers to curing by heat or ultraviolet to a state where the position of the film 16 does not move.

The storage elastic modulus of the semi-cured first curable composition at 20° C. is generally selected in the range of 0.01 Pa to 100,000 Pa, and particularly preferably in the range of 0.1 Pa to 1,000 Pa, from the viewpoint of the film not moving in a subsequent step and the performance, such as surface accuracy, of the obtained lens.

In a case where the first curable composition is a (thio) urethane-based material, from the aforementioned viewpoint, the semi-curing is performed such that polymerization degree is generally selected in the range of 30% to 70%, and particularly preferably in the range of 40% to 60%. The polymerization degree was measured by performing differential thermal analysis on what percentage of heat generation occurred relative to the total calorific value until the end of generation of polymerization heat due to the completion of polymerization.

By the steps a to d, a composite body in which a first mold substrate 12 having a forming surface 12a for forming an objective surface of a lens, a semi-cured first curable composition layer (semi-cured layer 14b) formed over the entire forming surface 12a of the first mold substrate 12, and a film 16 are laminated in this order, is obtained.

In this composite body, the first curable composition layer 14a is semi-cured, and the film 16 is positioned with respect to the forming surface 12a of the first mold substrate 12. Since this composite body can be transported, subsequent steps can be carried out elsewhere.

Also, the distance between the forming surface 12a and the film 16 is visually checked in the step of the composite body which is an intermediate product, not after a lens product has been obtained, so that the position of the film is checked beforehand, and thus it is possible to grasp beforehand whether or not defects that the film is exposed from an eyepiece surface do not occur in a final product having a polished eyepiece surface. Therefore, the yield and productivity of the lens product dramatically improves.

(Step e)

A second curable composition is injected into a cavity 22 between the film 16 and the second mold substrate 18 by predetermined means which are not shown (FIG. 1(e)).

The second curable composition is obtained by mixing a monomer with an additive such as a catalyst and, if necessary, performing degassing or filtering. In the second curable composition, those exemplified in the first curable composition 14 can be used. The first curable composition 14 and the second curable composition may be the same as or different from each other.

(Step f)

The semi-cured layer 14b of the first curable composition and the injected second curable composition are cured to form substrate layers 24 and 26 over both sides of the film 16 (FIG. 1(f)).

The curing is performed by heat or ultraviolet light. In the case of thermal curing, it is general to gradually increase the temperature from low temperature to 80° C. to 150° C. over 6 to 50 hours.

(Step g)

After completing the curing, the fastening member 20, the first mold substrate 12, and the second mold substrate 18 are removed to obtain a plastic lens in which the substrate layers 24 and 26 are laminated over both sides of the film 16 (FIG. 1(g)).

The obtained lens, if necessary, is subjected to annealing treatment by heating the released lens, for the purpose of alleviating distortion. Annealing temperature is generally in the range of 80° C. to 150° C., and preferably in the range of 90° C. to 130° C. Annealing time is generally in the range of 0.5 to 10 hours, and preferably in the range of 1 to 6 hours.

In the first embodiment, it has been explained by example that the step c of covering an outer edge of the first mold substrate 12, an outer edge of the film 16, and an outer edge of a second mold substrate 18 for forming the other surface of the lens with a fastening member 20 to support them and to place the second mold substrate 18 so as to be opposed to the film with being spaced apart from the film 16 by a predetermined distance is carried out, and then the step d of semi-curing the first curable composition 14 is carried out. However, step c may be carried out after step d is carried out.

Through the above steps, a plastic lens can be manufactured.

Second Embodiment

The method of manufacturing a plastic lens according to this embodiment includes the following steps.

Figure 2:
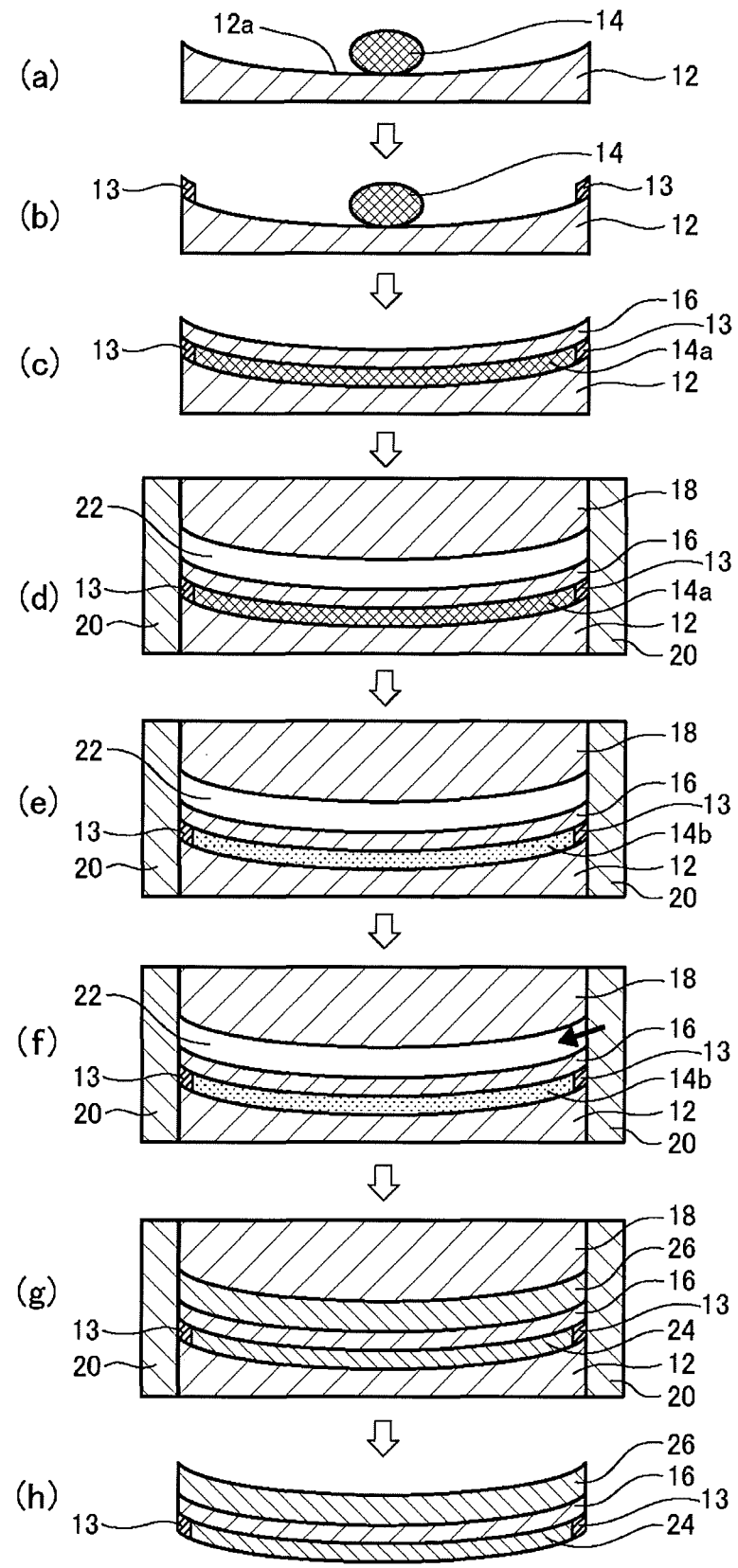
FIG. 2 is a schematic process sectional view showing a method of manufacturing a plastic lens according to a second embodiment.

Step a: a predetermined amount of a first curable composition 14 is put over a forming surface 12a of a first mold substrate 12 having the forming surface 12a for forming an objective surface of a lens (FIG. 2(a)).

Step b: a spacer 13 is placed over a forming surface 12a of a first mold substrate 12 having the forming surface 12a for forming an objective surface of a lens (FIG. 2(b)).

Step c: the first curable composition 14 is spread over the entire forming surface 12a by pressing the composition 14 with a film 16 to form a first curable composition layer 14a, and the first mold substrate 12 and the film 16 are separated from each other by a predetermined distance through the first curable composition layer 14a (FIG. 2(c)).

Step d: an outer edge of the first mold substrate 12, an outer edge of the spacer 13, an outer edge of the film 16, and an outer edge of a second mold substrate 18 having a forming surface for forming the other surface of the lens are covered with a fastening member 20 to support them in place, and the second mold substrate 18 is placed so as to be opposed to the film 16 with being spaced apart from the film 16 by a predetermined distance (FIG. 2(d)).

Step e: the first curable composition layer 14a is semi-cured to form a semi-cured layer 14b (FIG. 2(e)).

Step f: a second curable composition is injected into a cavity 22 between the film 16 and the second mold substrate 18 (FIG. 2(f)).

Step g: the semi-cured layer 14b of the first curable composition and the injected second curable composition are cured to form substrate layers 24 and 26 over both sides of the film 16 (FIG. 2(g)).

Step h: the fastening member 20, the first mold substrate 12, and the second mold substrate 18 are removed to obtain a plastic lens (FIG. 2(h)).

Step a, step c, step d, step e, step f, step g, and step h are the same as those in the first embodiment, and thus a description thereof will not be repeated.

(Step b)

A spacer 13 for positioning the film 16 more correctly is placed over a forming surface 12a of a first mold substrate 12 having the forming surface 12a for forming an objective surface of a lens (FIG. 2(b)).

The spacer 13 is placed along the outer peripheral edge of the forming surface 12a for forming the objective surface of the lens, thereby more reliably positioning the film 16.

The spacer 13 can adopt various forms as long as it can be placed along the outer peripheral edge of the forming surface 12a for forming the objective surface of the lens. Although a ring shape is preferably used, a plurality of blocks may be used.

The spacer 13 can be used as long as it has a predetermined height and can withstand the heat of polymerization curing not to adversely affect the lens. However, from the viewpoints of ease of molding, cost, and the like, plastics, such as polyethylene (PE), polypropylene (PP), polyvinyl chloride (PVA), ethylene-vinyl acetate copolymer resin (EVA), and polytetrafluoroethylene (PTFE), are preferably used.

When the spacer 13 is in close contact with the lens taken out in the step h, the spacer 13 is removed by a polishing process or an edge grinding process (polishing to a shape corresponding to a frame) process.

In the second embodiment, it has been explained by example that the step a of putting a first curable composition 14 over a forming surface 12a of a first mold substrate 12, and then the step b of placing a spacer 13 over a forming surface 12a of a first mold substrate 12 having the forming surface 12a for forming an objective surface of a lens is carried out. However, step a may be carried out after step b is carried out.

Even in the second embodiment, similarly to in the first embodiment, it has been explained by example that the step d of covering an outer edge of the first mold substrate 12, an outer edge of the film 16, and an outer edge of a second mold substrate 18 for forming the other surface of the lens with a fastening member 20 to support them and to place the second mold substrate 18 so as to be opposed to the film 16 with being spaced apart from the film 16 by a predetermined distance is carried out, and then the step e of semi-curing the first curable composition layer 14a is carried out. However, step d may be carried out after step e is carried out.

Third Embodiment

The method of manufacturing a plastic lens according to this embodiment includes the following steps.

Step a: a first curable composition having a viscosity of 1,000 mPa·s to 100,000 mPa·s is put over a forming surface of a first mold substrate having the forming surface for forming an objective surface of a lens.

Step b: the first curable composition is spread over the entire forming surface by pressing the composition with a film to form a first curable composition layer, and the first mold substrate and the film are separated from each other by a predetermined distance through the first curable composition layer.

Step c: an outer edge of the first mold substrate, an outer edge of the film, and an outer edge of a second mold substrate having a forming surface for forming the other surface of the lens are covered with a fastening member to support them in place, and the second mold substrate is placed so as to be opposed to the film with being spaced apart from the film by a predetermined distance.

Step d: a second curable composition is injected into a cavity between the film and the second mold substrate.

Step e: the first curable composition layer and the injected second curable composition are cured to form substrate layers over both sides of the film.

Step f: the fastening member, the first mold substrate, and the second mold substrate are removed to obtain a plastic lens.

Step b, step c, step d, step e, and step f are the same as those in the first embodiment except that step numbers are different, and thus a description thereof will not be repeated.

(Step a)

In this step, from the viewpoint of the film not moving in a subsequent step and the properties, such as surface accuracy, of the obtained lens, a first curable composition having a viscosity of 1,000 to 100,000 mPa·s may be used. The viscosity of the first curable composition may be preferably 2,000 mPa·s to 80,000 mPa·s, more preferably 3,000 mPa·s to 50,000 mPa·s, and particularly preferably 4,000 mPa·s to 30,000 mPa·s. The viscosity of the first curable composition is a viscosity at 20° C. measured by a B type viscometer. This embodiment can be carried out by the same operation using the same components as in the step a of the first embodiment, except that the first curable composition having a viscosity within the above range is used.

In the adjustment of the viscosity of the first curable composition, the viscosity of the first curable composition can be adjusted by preparing the first curable composition and then leaving this composition to have a desired viscosity. Generally, it is possible to reach a preferable viscosity by leaving this composition at room temperature in the range of 1 to 200 hours. Stirring may be performed. Leaving time may be shortened by warming.

The placement of the first curable composition having a viscosity of 1,000 mPa·s to 100,000 mPa·s onto the first mold substrate includes not only a method of putting the first curable composition having the viscosity within the above range by adjusting as described above onto the first mold substrate, but also a method of leaving the low-viscosity first curable composition put over the first mold substrate over the first mold substrate until the above viscosity range is reached.

By the steps a to c, a composite body in which a first mold substrate having a forming surface for forming an objective surface of a lens, a first curable composition layer having a viscosity of 1,000 mPa·s to 100,000 mPa·s formed over the entire forming surface of the first mold substrate, and a film are laminated in this order, is obtained.

In this composite body, the first curable composition layer has a predetermined viscosity, and the film is positioned with respect to the forming surface of the first mold substrate. Since this composite body can be transported, subsequent steps can be carried out elsewhere.

Also, the distance between the forming surface and the film is visually checked in the step of the composite body which is an intermediate product, not after a lens product has been obtained, so that the position of the film is checked beforehand, and thus it is possible to grasp beforehand whether or not defects that the film is exposed from an eyepiece surface do not occur in a final product having a polished eyepiece surface. Therefore, the yield and productivity of the lens product dramatically improves.

Fourth Embodiment

The method of manufacturing a plastic lens according to this embodiment includes the following steps.

Step a: a first curable composition having a viscosity of 1,000 mPa·s to 100,000 mPa·s is put over a forming surface of a first mold substrate having the forming surface for forming a surface of a lens.

Step b: a spacer is placed over the forming surface of the first mold surface.

Step c: the first curable composition is spread over the entire forming surface by pressing the composition with a film to form a first curable composition layer, and the first mold substrate and the film are separated from each other by a predetermined distance through the first curable composition layer.

Step d: an outer edge of the first mold substrate, an outer edge of the spacer, an outer edge of the film, and an outer edge of a second mold substrate having a forming surface for forming the other surface of the lens are covered with a fastening member to support them in place, and the second mold substrate is placed so as to be opposed to the film with being spaced apart from the film by a predetermined distance.

Step e: a second curable composition is injected into a cavity between the film and the second mold substrate.

Step f: the first curable composition layer and the injected second curable composition are cured to form substrate layers over both sides of the film.

Step g: the fastening member, the first mold substrate, and the second mold substrate are removed to obtain a plastic lens.

Step a and step e are the same as those in the third embodiment, and step b, step c, step d, step f, and step g are the same as those in the second embodiment. Therefore, a description thereof will not be repeated.

The plastic lenses obtained in the embodiments 1 to 4 may be used after applying a coating layer on one side or both sides, as needed. Examples of the coating layer include a primer layer, a hard coat layer, an antireflection film layer, an antifog coat layer, an antifouling layer, and a water repellent layer. These coating layers may be used alone, or may also be used as a multi-layered coating layer of the plurality of coating layers. When the coating layers are applied on both sides, the same coating layer may be applied to each side, or different coating layers may be respectively applied to both sides.

These coating layers may be respectively used in combination with an ultraviolet absorber for the purpose of protecting a lens and an eye from ultraviolet rays, an infrared absorber for the purpose of protecting an eye from infrared rays, a light stabilizer and an antioxidant for the purpose of improving the weather resistance of a lens, a dye and a pigment, particularly, a photochromic dye and a photochromic pigment for the purpose of enhancing the fashionability of a lens, an antistatic agent, and other known additives for the purpose of enhancing the performance of a lens. Various leveling agents may be used for the purpose of improving coatability.

Generally, the primer layer is formed between a lens substrate and a hard coat layer for the purpose of improving the adhesiveness of the hard coat layer and the impact resistance of a lens, and the film thickness thereof is generally about 0.1 µm to 10 µm.

The primer layer is formed by, for example, a coating method or a dry method. In the coating method, the primer layer is formed by applying a primer composition using a known coating method such as spin coating or dip coating, and then solidifying the applied primer composition. In the dry method, the primer layer is formed by a known dry method such as a CVD method or a vacuum vapor deposition method. When forming the primer layer, if necessary, the surface of a lens may be subjected to pretreatment such as alkali treatment, plasma treatment, or ultraviolet treatment for the purpose of improving adhesiveness.

As the primer composition, a material having high adhesiveness between the solidified primer layer and the lens substrate is preferable. Generally, a primer composition containing a urethane resin, an epoxy resin, a polyester resin, a melanin resin, or polyvinyl acetal as a main ingredient is used. The primer composition can be used without a solvent, but an appropriate solvent which does not affect a lens may be used for the purpose of adjusting the viscosity of the composition.

The hard coat layer is a coating layer intended to impart functions such as scratch resistance, abrasion resistance, moisture resistance, hot water resistance, heat resistance, and weather resistance to the surface of a lens, and the film thickness thereof is about 0.3 µm to 30 µm.

The hard coat layer is generally formed by applying a hard coat composition using a known coating method such as spin coating or dip coating, and then curing the hard coat composition. Examples of the curing method include a heat curing method and a curing method by energy ray irradiation such as ultraviolet ray irradiation or visible ray irradiation. When forming the hard coat layer, if necessary, a coating surface (lens substrate or primer layer) may be subjected to pretreatment such as alkali treatment, plasma treatment, or ultraviolet treatment for the purpose of improving adhesiveness.

Generally, as the hard coat composition, a mixture of an organic silicon compound having curability and fine oxide particles (including composite fine oxide particles) of Si, Al, Sn, Sb, Ta, Ce, La, Fe, Zn, W, Zr, In, and Ti is often used. In addition to these, amines, amino acids, metal acetylacetonate composite bodies, metal salts of organic acids, perchloric acids, salts of perchloric acids, acids, metal chlorides, polyfunctional epoxy compounds, and the like may be used. The hard coat composition can be used without a solvent, but an appropriate solvent which does not affect a lens may be used.

The antireflection layer, if necessary, is generally formed on the hard coat layer. The antireflection layer includes an inorganic antireflection layer and an organic antireflection layer. In a case of an inorganic antireflection layer, generally, the antireflection layer is often formed by a dry method such as a vacuum deposition method, a sputtering method, an ion plating method, an ion beam assist method, or a CVD method using an inorganic oxide such as $SiO_2$ or $TiO_2$. In a case of an organic antireflection layer, generally, the antireflection layer is often formed by a wet method using a composition containing an organosilicon compound and silica-based fine particles having internal cavities.

Although the antireflection layer may be a single layer or a multilayer, when the antireflection layer is used as a single layer, it is preferable that the refractive index of the antireflection layer is at least 0.1 lower than the refractive index of the hard coat layer. In order to effectively exhibit an antireflection function, it is preferable to form a multilayered antireflection film, in which case, generally, a low refractive index film and a high refractive index film are alternately laminated. Even in this case, the refractive index difference between the low refractive index film and the high refractive index film is preferably 0.1 or more. Examples of the high refractive index film include films of ZnO, $TiO_2$, $CeO_2$, $Sb_2O_5$, $SnO_2$, $ZrO_2$, and $Ta_2O_5$, and an example of the low refractive index film includes a $SiO_2$ film. The film thickness is generally about 50 nm to 150 nm.

Further, the plastic lens obtained in this embodiment may be subjected to outer periphery polishing, back surface polishing, antistatic treatment, dyeing treatment, light control treatment, and the like, as needed.

Such a plastic lens is useful as a polarizing lens for eyeglasses, particularly, as a polarizing lens for vision correction.

Although the embodiments of the invention have been described above, these embodiments illustrate the invention, and various configurations other than the above configuration can be adopted within the range not impairing the effects of the invention.

EXAMPLES

Hereinafter, the invention will be described in more detail with reference to examples, but the invention is not limited thereto.

<Preparation of Curable Composition-1>

50.6 parts by weight of m-xylylene diisocyanate, 49.4 parts by weight of a mixture of 4,8-dimercaptomethyl-1,11-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane, 0.01 part by weight of dibutyltin dichloride as a curing accelerator, 0.15 parts by weight of Zelec UN (registered trademark, manufactured by Stepan Co., Ltd.) as a releasing agent, and 1.50 parts by weight of Seesorb 709 (manufactured by Shipro Kasei Kaisha, Ltd.) as an ultraviolet absorber were stirred and dissolved, and then degassed under reduced pressure, so as to prepare a curable composition-1. The viscosity of the curable composition-1 at 20° C. was 30 mPa·s (measured after 1 hour of stirring and dissolving).

<Preparation of Curable Composition-2>

50.6 parts by weight of bis(isocyanatomethyl) bicyclo-[2.2.1]-heptane (mixture of 2,5-isomer and 2,6-isomer), 23.9 parts by weight of pentaerythritol tetrakis(3-mercaptopropionate), 25.5 parts by weight of 4-mercaptomethyl-1,8-dimercapto-3,6-dithiaoctane, 0.03 parts by weight of dibutyltin dichloride as a curing accelerator, 0.15 parts by weight of Zelec UN (registered trademark, manufactured by Stepan Co., Ltd.) as a release agent, and 1.50 parts by weight of Seesorb 709 (manufactured by Shipro Kasei Kaisha, Ltd.) as an ultraviolet absorber were mixed and dissolved, and then degassed under reduced pressure, so as to prepare a curable composition-2. The viscosity of the curable composition-1 at 20° C. was 40 mPa·s (measured after 1 hour of stirring and dissolving).

<Preparation of Curable Composition-3>

100.0 parts by weight of RAV 7AT (manufactured by Acomon Co., Ltd.), 0.40 parts by weight of PEROIL IPP-27 (CR) (manufactured by NOF Corporation) as a curing accelerator, and 0.10 parts by weight of CIERSORB UV 24 (manufactured by Cytec Co., Ltd.) as an ultraviolet absorber were mixed and dissolved, and then degassed under reduced pressure, so as to prepare a curable composition-3.

<Preparation of Shaped Polarizing Film-1>

A polyethylene terephthalate polarizing film (thickness 140 microns) was heat-treated at 140° C. beforehand, and then formed into a curved shape of 6C (curve) at a shaping temperature of 160° C. by a hot press method. After cutting the polarizing film according to the size of a mold, the front and back surfaces of the polarizing film were respectively irradiated with plasma for 20 seconds using a plasma irradiation surface reforming apparatus (PS-601 SW type, manufactured by Wedge Co., Ltd.), washed with methanol, and then air-dried. Both sides of this polyethylene terephthalate polarizing film were coated with Saprene IB-422 (a polyester-based polyurethane coating agent, manufactured by Sanyo Chemical Industries, Ltd.), and dried at about 50 to 60° C., so as to obtain a shaped polarizing film-1.

<Preparation of Shaped Polarizing Film-2>

A polyvinyl alcohol polarizing film (thickness 37 microns) was heated for 0.5 hours at a temperature of 100° C. using a hot air circulation oven. The heated film was allowed to absorb moisture, and formed into a curved shape of 6C (curve) using a glass mold. The polarizing film was cut according to the size of the mold, and then dried at a temperature of 80° C. under a pressure of 30 torr, so as to obtain a shaped polarization film-2.

Example 1

4.5 g of the curable composition-1 having passed through a Teflon filter of 3 μm was put on the forming surface of a glass-made first mold substrate (outer diameter: 81.0 mm, forming surface curvature: 133.5 mm, center thickness: 4.0 mm) for forming an objective surface of a lens. Then, a low-density polyethylene-based ring-shaped spacer (outer diameter: 81.0 mm, inner diameter: 77.5 mm, height: 0.8 mm) was placed along the outer peripheral edge of the forming surface of the first mold substrate.

The placed curable composition-1 was spread over the entire forming surface of the first mold substrate with the shaped polarizing film-1. Then, the outer edge of the first mold substrate, the outer edge of the spacer, the outer edge of the polarizing film, and the outer edge of a glass-made second mold substrate (outer diameter: 81.0 mm, forming surface curvature: 85.0 mm, center thickness: 5.0 mm) for forming the other surface of the lens were covered by winding with a tape "Sliontech 6263" manufactured by Hitachi Maxell, Ltd., so as to support them in place.

In this state, the curable composition-1 was left at 25 to 35° C. for 14 hours to be semi-cured. The distance between the polarizing film and the first mold substrate during semi-curing was visually confirmed.

In order to ascertain the storage elastic modulus of the curable composition-1 at the time of semi-curing, additional simulated polymerization was carried out, and the measurement of the elastic modulus was performed by a rheometer, so that it was confirmed that the storage elastic modulus of the curable composition-1 at 20° C. during semi-curing was 10 Pa. Further, about 1 g of the semi-cured curable composition was put on a glass plate and tilted at 45° for 1 minute, but this curable composition did not move. Moreover, it was confirmed by a separately performed differential thermal analysis that the polymerization degree of the curable composition-1 during semi-curing was 46%.

Subsequently, a newly prepared curable composition-1 was injected through a 3 μm Teflon filter such that the cavity between the polarizing film and the second mold substrate was filled.

The lens casting mold was placed in a hot air circulation oven, heated from 15° C. to 110° C. over 30 hours. Thereafter, this lens casting mold was maintained at 110° C. for 3 hours, slowly cooled, and then taken out from the oven. The tape, the first mold substrate, and the second mold substrate were removed from the lens casting mold to release a polarizing lens, and the released polarizing lens was annealed at 110° C. for 2 hours to obtain a polarizing lens.

When the polarizing lens was cut and the position of the polarizing film was observed, the polarizing film was set at a position of a depth of 0.8 mm from the objective surface together with 3 points of an outer peripheral portion and a center point.

Example 2

3.0 g of the curable composition-2 having passed through a Teflon filter of 3 μm was put on the forming surface of a glass-made first mold substrate (outer diameter: 81.0 mm, forming surface curvature: 133.5 mm, center thickness: 4.0 mm) for forming an objective surface of a lens. Then, a silicone-based ring-shaped spacer (outer diameter: 81.0 mm, inner diameter: 77.5 mm, height: 0.5 mm) was placed along the outer peripheral edge of the forming surface of the first mold substrate.

The put curable composition-2 was spread over the entire forming surface of the first mold substrate with the shaped polarizing film-2. Then, the outer edge of the first mold substrate, the outer edge of the spacer, the outer edge of the polarizing film, and the outer edge of a glass-made second mold substrate (outer diameter: 81.0 mm, forming surface curvature: 85.0 mm, center thickness: 5.0 mm) for forming the other surface of the lens were covered by winding with a tape "Sliontech 6263" manufactured by Hitachi Maxell, Ltd., so as to support them in place.

In this state, the curable composition-2 was left at 30 to 40° C. for 17 hours to be semi-cured. The distance between the polarizing film and the first mold substrate during semi-curing was visually confirmed. Further, about 1 g of the curable composition-2 separately semi-cured under the same conditions was put on a glass plate and tilted at 45° for 1 minute, but this curable composition did not move.

Subsequently, a newly prepared curable composition-2 was injected through a 3 μm Teflon filter such that the cavity between the polarizing film and the second mold substrate was filled.

The lens casting mold was placed in a hot air circulation oven, heated from 15° C. to 120° C. over 17 hours. Thereafter, this lens casting mold was maintained at 120° C. for 3 hours, slowly cooled, and then taken out from the oven. The tape, the first mold substrate, and the second mold substrate were removed from the lens casting mold to release a polarizing lens, and the released polarizing lens was annealed at 120° C. for 2 hours to obtain a polarizing lens.

When the polarizing lens was cut and the position of the polarizing film was observed, the polarizing film was set at a position of a depth of 0.5 mm from the objective surface together with 3 points of an outer peripheral portion and a center point.

Example 3

3.0 g of the curable composition-3 having passed through a Teflon filter of 3 μm was put on the forming surface of a glass-made first mold substrate (outer diameter: 81.0 mm, forming surface curvature: 75.7 mm, center thickness: 4.0 mm) for forming an objective surface of a lens. Then, a silicone-based ring-shaped spacer (outer diameter: 81.0 mm, inner diameter: 77.5 mm, height: 0.5 mm) was placed along the outer peripheral edge of the forming surface of the first mold substrate.

The put curable composition-3 was spread over the entire forming surface of the first mold substrate with the shaped polarizing film-2 treated with a silane coupling agent (Shin-Etsu Silicone KBM-503, manufactured by Shin-Etsu Chemical Co., Ltd.). Then, the outer edge of the first mold substrate, the outer edge of the spacer, the outer edge of the polarizing film, and the outer edge of a second mold substrate (outer diameter: 81.0 mm, forming surface curvature: 88.5 mm, center thickness: 4.0 mm) for forming the other surface of the lens were covered by winding with a tape "Sliontech 6263" manufactured by Hitachi Maxell, Ltd., so as to support them in place.

In this state, the curable composition-3 was left at 25 to 35° C. for 10 hours to be semi-cured. The distance between the polarizing film and the first mold substrate during semi-curing was visually confirmed. Further, about 1 g of the curable composition separately semi-cured under the same conditions was put on a glass plate and tilted at 45° for 1 minute, but this curable composition did not move.

Subsequently, a newly prepared curable composition-3 was injected through a 3 μm Teflon filter such that the cavity between the polarizing film and the second mold substrate was filled.

The lens casting mold was placed in a hot air circulation oven, heated from 25° C. to 80° C. over 18 hours. Thereafter, this lens casting mold was maintained at 80° C. for 2 hours, slowly cooled, and then taken out from the oven. The tape, the first mold substrate, and the second mold substrate were removed from the lens casting mold to release a polarizing lens, and the released polarizing lens was annealed at 90° C. for 5 hours to obtain a polarizing lens.

When the polarizing lens was cut and the position of the polarizing film was observed, the polarizing film was set at a position of a depth of 0.5 mm from the objective surface together with 3 points of an outer peripheral portion and a center point.

Example 4

3.5 g of the curable composition-2 having passed through a Teflon filter of 3 μm was put on the forming surface of a glass-made first mold substrate (outer diameter: 81.0 mm, forming surface curvature: 133.5 mm, center thickness: 4.0 mm) for forming an objective surface of a lens. This glass-made first mold substrate was placed in a hot air circulation oven, left at 50° C. for 5 hours, and slowly cooled. The viscosity of the curable composition (20° C.), measured by a B type viscometer, was 10,000 mPa·s.

Then, a low-density polyethylene-based ring-shaped spacer (outer diameter: 81.0 mm, inner diameter: 77.5 mm, height: 0.8 mm) was placed along the outer peripheral edge of the forming surface of the first mold substrate.

The curable composition was spread over the entire forming surface of the first mold substrate with the shaped polarizing film-1. Then, the outer edge of the first mold substrate, the outer edge of the spacer, the outer edge of the polarizing film, and the outer edge of a glass-made second mold substrate (outer diameter: 81.0 mm, forming surface curvature: 85.0 mm, center thickness: 5.0 mm) for forming the other surface of the lens were covered by winding with a tape "Sliontech 6263" manufactured by Hitachi Maxell, Ltd., so as to support them in place.

At this time, the distance between the polarizing film and the first mold substrate during semi-curing was visually confirmed.

Subsequently, a newly adjusted curable composition-2 was injected into a cavity between the polarizing film and the second mold substrate through a 3 μm Teflon filter to fill the space.

The lens casting mold was placed in a hot air circulation oven, heated from 15° C. to 110° C. over 30 hours. Thereafter, this lens casting mold was maintained at 110° C. for 3 hours, slowly cooled, and then taken out from the oven. The tape, the first mold substrate, and the second mold substrate were removed from the lens casting mold to release a polarizing lens, and the released polarizing lens was annealed at 110° C. for 2 hours to obtain a polarizing lens.

When the polarizing lens was cut and the position of the polarizing film was observed, the polarizing film was set at a position of a depth of 0.6 mm from the objective surface together with 3 points of an outer peripheral portion and a center point.

This application is based on Japanese Patent Application No. 2015-049440, filed on Mar. 12, 2015, the entire disclosure of which is incorporated hereinto by reference.

The invention claimed is:

1. A method of manufacturing a plastic eyeglass lens, comprising:
   a step of putting a first curable composition over a forming surface of a first mold substrate having the forming surface for forming a lens surface;
   a step of spreading the first curable composition over the entire forming surface by pressing the first curable composition with a film to form a first curable composition layer and separating the film from the first mold substrate by a predetermined distance through the formed first curable composition layer;
   a step of covering an outer edge of the first mold substrate, an outer edge of the film, and an outer edge of a second mold substrate having a forming surface for forming the other surface of the lens with a tape or a gasket to support them and to place the second mold substrate so as to be opposed to the film with being spaced apart from the film by a predetermined distance;
   a step of semi-curing the first curable composition layer;
   a step of injecting a second curable composition into a cavity between the film and the second mold substrate, wherein the second curable composition is injected into the cavity after the first curable composition is semi-cured and is injected when the first curable composition has formed a semi-cured layer;
   a step of curing the semi-cured first curable composition layer and the injected second curable composition to form substrate layers over both sides of the film; and
   a step of removing the tape or the gasket, the first mold substrate and the second mold substrate to obtain a plastic eyeglass lens.

2. The method of manufacturing a plastic eyeglass lens according to claim 1,
   wherein the step of semi-curing the first curable composition layer is a step of semi-curing the first curable composition layer such that the position of the film does not move at a position spaced apart from the forming surface of the first mold substrate by 0.1 mm to 3.0 mm.

3. The method of manufacturing a plastic eyeglass lens according to claim 1,
   wherein a storage elastic modulus of the semi-cured first curable composition at 20° C. is 0.01 Pa to 100,000 Pa.

4. The method of manufacturing a plastic eyeglass lens according to claim 1,
   wherein a storage elastic modulus of the semi-cured first curable composition at 20° C. is 0.1 Pa to 1,000 Pa.

5. The method of manufacturing a plastic eyeglass lens according to claim 1,
   wherein the first curable composition is a (thio)urethane material, and the polymerization degree of the semi-cured first curable composition is 30% to 70%.

6. The method of manufacturing a plastic eyeglass lens according to claim 1,
   wherein, in the step of putting the first curable composition, the viscosity of the first curable composition at 20° C., measured by a B type viscometer, is 1 mPa·s to 500 mPa·s.

7. The method of manufacturing a plastic eyeglass lens according to claim 1, further comprising:
   a step of putting a spacer for positioning the film over the forming surface of the first mold substrate before or after the step of putting the first curable composition over the forming surface of the first mold substrate.

8. The method of manufacturing a plastic eyeglass lens according to claim 7,
   wherein the spacer has a ring shape, and is placed along an outer peripheral edge over the forming surface of the first mold substrate.

9. The method of manufacturing a plastic eyeglass lens according to claim 1,
   wherein the film is a shaped polarizing film.

10. The method of manufacturing a plastic eyeglass lens according to claim 9,
    wherein the polarizing film is a polyvinyl alcohol film or a thermoplastic polyester film.

11. A method of manufacturing a plastic eyeglass lens, comprising:
- a step of putting a first curable composition having a viscosity of 2,000 mPa·s to 80,000 mPa·s over a forming surface of a first mold substrate having the forming surface for forming a lens surface;
- a step of spreading the first curable composition over the entire forming surface by pressing the first curable composition with a film to form a first curable composition layer and separating the film from the first mold substrate by a predetermined distance through the formed first curable composition layer;
- a step of covering an outer edge of the first mold substrate, an outer edge of the film, and an outer edge of a second mold substrate having a forming surface for forming the other surface of the lens with a fastening member to support them and to place the second mold substrate so as to be opposed to the film with being spaced apart from the film by a predetermined distance;
- a step of injecting a second curable composition into a cavity between the film and the second mold substrate;
- a step of curing the first curable composition layer and the injected second curable composition to form substrate layers over both sides of the film; and
- a step of removing the fastening member, the first mold substrate and the second mold substrate to obtain a plastic lens.

12. The method of manufacturing a plastic eyeglass lens according to claim 11,
wherein the fastening member is a tape or a gasket.

13. The method of manufacturing a plastic eyeglass lens according to claim 11, further comprising:
- a step of putting a spacer for positioning the film over the forming surface of the first mold substrate before or after the step of putting the first curable composition over the forming surface of the first mold substrate.

14. The method of manufacturing a plastic eyeglass lens according to claim 13,
wherein the spacer has a ring shape, and is placed along an outer peripheral edge over the forming surface of the first mold substrate.

15. The method of manufacturing a plastic eyeglass lens according to claim 11,
wherein the film is a shaped polarizing film.

16. The method of manufacturing a plastic eyeglass lens according to claim 15,
wherein the polarizing film is a polyvinyl alcohol film or a thermoplastic polyester film.

* * * * *